Feb. 10, 1925.
W. L. COOPER
AIRPLANE LIFTING DEVICE
Filed July 22, 1924        2 Sheets-Sheet 2
1,525,852
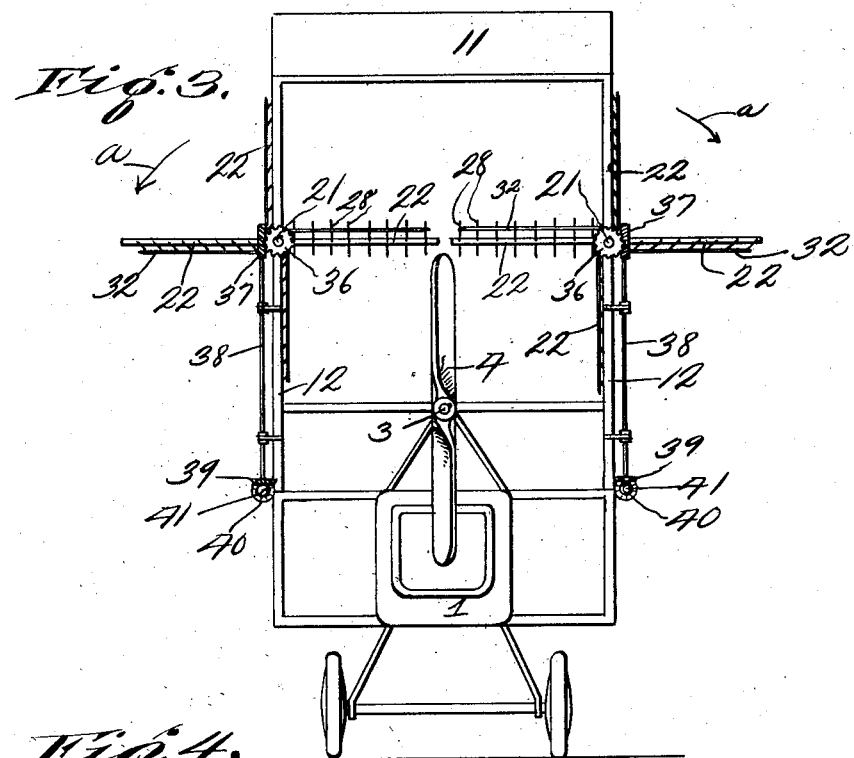
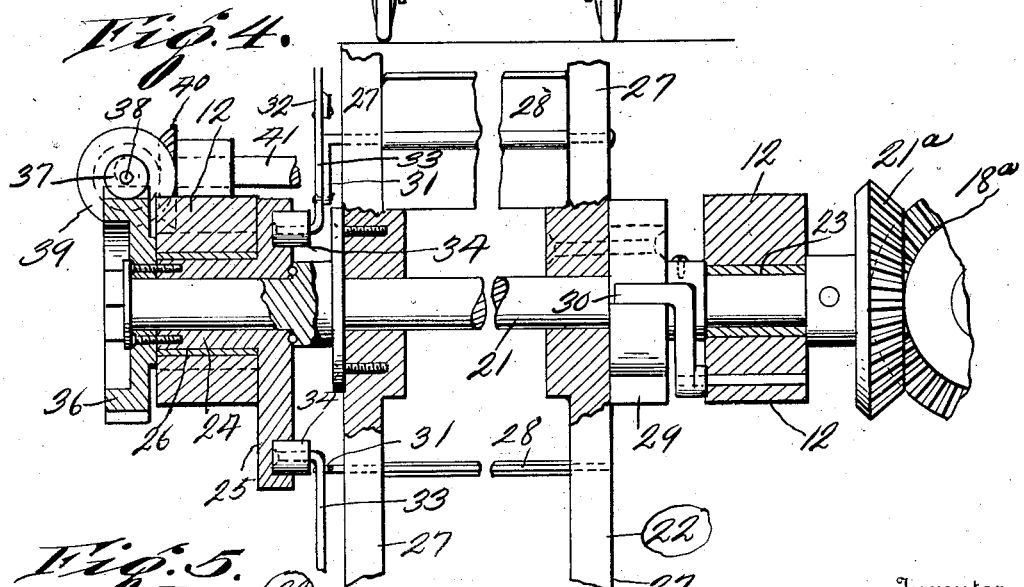
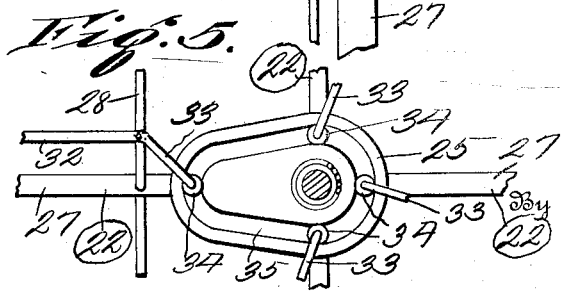
Inventor
W. L. Cooper
Attorney Patented Feb. 10, 1925.

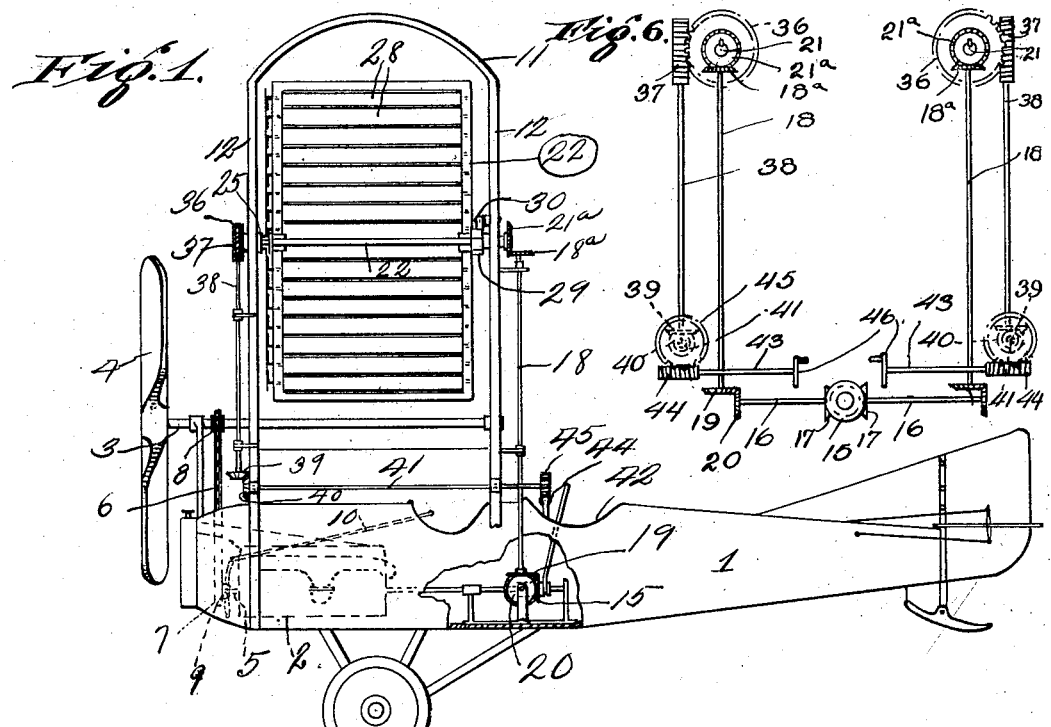

1,525,852

UNITED STATES PATENT OFFICE.

WARREN L. COOPER, OF PUEBLO, COLORADO.

AIRPLANE-LIFTING DEVICE.

Application filed July 22, 1924. Serial No. 727,464.

*To all whom it may concern:*

Be it known that I, WARREN L. COOPER, a citizen of the United States, residing at Pueblo, in the county of Pueblo, State of Colorado, have invented new and useful Airplane-Lifting Devices; and I do hereby declare the following to be a full, clear, and exact description of the invention, such as will enable others skilled in the art to which it appertains to make and use the same.

The invention relates to airplane lifting devices, and has for its object to provide a device of this character whereby an airplane will be lifted vertically sufficiently high for it to clear uneven ground, trees or buildings until it reaches a position where it may start forwardly under its forward driving mechanism.

A further object is to provide the airplane with revolving radially disposed wings formed from frames having pivoted shutters and driving connections between said revolving wings and the engine of the airplane, whereby said wings may be revolved for moving the airplane vertically during a launching operation or allowing the airplane to move downwardly vertically during a lowering operation. Also to provide clutch means whereby said wings and their driving connections may be disconnected from the engine when not in use, and the horizontally disposed wings in combination with the plane of the airplane utilized as planes.

A further object is to provide the wings with pivoted shutters linked together and cam means controllable from within the airplane and cooperating with the links of the pivoted shutters, whereby during the rotation of the wings, said shutters will be feathered on their upward movement, thereby allowing the wings, when on their downward movement to exert a lifting power.

Also to pivotally mount the cams whereby upon rotative adjustment thereof the pivoted vanes of the wings may be opened when the wings are in different radial position.

A further object is to provide the cam slots in which rollers carried by control levers are mounted and which control levers are pivotally connected to the vanes of the wings and the cams utilized for simultaneously varying or controlling the vanes of all of the wings.

A further object is to provide pawl and ratchet means for preventing retrograde rotation of the wings.

A further object is to provide the vane control-cam with a sleeve mounted in a brace of the airplane and in which sleeve is rotatably mounted the shaft of the wings. Also to provide the sleeve with a gear, with which gear means cooperates for adjusting the position of the cam.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the airplane showing the lifting wings applied thereto.

Figure 2 is a top plan view of the airplane.

Figure 3 is front elevation of the airplane.

Figure 4 is a horizontal sectional view on an enlarged scale through the vertical braces at one side of the airplane, a control cam and control gears for the cam and wings.

Figure 5 is a view in elevation of the inside of one of the control cams, showing the vane lever rollers disposed therein.

Figure 6 is a rear elevation of the cam controlling means and the wing rotating means, structural parts of the airplane being eliminated to better illustrate the shafting and gear connections.

Referring to the drawing, the numeral 1 designates a conventional form of fuselage of an airplane and 2 an engine disposed therein. Disposed above the engine is a propeller drive shaft 3, on which a conventional form of propeller is mounted. Propeller drive shaft 3 is driven from the engine shaft 5 by means of a sprocket chain 6 which extends over sprockets 7 and 8 respectively carried by the engine drive shaft 5 and the propeller drive shaft 3, therefore it will be seen that the propeller 4 will propel the airplane forwardly, and it is to be understood that any kind of propeller controlling means may be provided whereby said propeller may be started and stopped as desired, and for purposes of illustration a conventional form of clutch 9 is shown, which may be controlled through the medium of a rod 10 or in any other suitable manner. During the forward movement of the airplane under the influence of the propeller 4, the airplane is supported by the plane 11 carried by the upper ends of the vertically disposed struts 12 in combination with means hereinafter set forth.

The engine drive shaft 5 extends rearwardly in the fuselage 3 and is provided with a clutch member 13, with which clutch member 14 carried by a slidable bevel gear 15 cooperates, and it will be seen that when the clutch members 13 and 14 are in interengagement the bevelled gear 15 will be rotated. Extending outwardly from opposite sides of the fuselage 1 are shafts 16, the inner ends of which shafts are provided with bevelled gears 17, which mesh with the bevelled gear 15 when the clutch members 13 and 14 are in interengagement, consequently the shafts 16 are rotated in opposite direction. Vertically disposed and rotatably mounted in bearings carried by the rear struts 12 are shafts 18, the lower ends of which are provided with bevelled gears 19 which mesh with bevelled gears 20 carried by the outer ends of the shafts 16, therefore it will be seen that when the shafts 16 are rotated simultaneously, the shafts 18 will also rotate and simultaneously impart rotation to the lifting wing drive shafts 21 in the direction of the arrows $a$, by means of the gears 21$^a$ and 18$^a$, thereby rotating the lifting wings in the same direction. Shafts 21 have one of their ends rotatably mounted in bearings 23 of the rear struts 12 and their other ends rotatably mounted in the sleeve 24 of a rotatable cam 25 and which sleeve 24 is rotatably mounted in a bearing 26 of each forward strut 12, therefore it will be seen that the cam 25 can be rotated during the rotation of the wings 22, and the shaft 21 on which the wings are mounted. The wings 22 are formed from spaced arms 27, and between which arms are pivotally mounted vanes 28. During the rotation of the wings 22 the vanes 28 upon the upward movement of the wings are opened to positions where they will feather and consequently the resistance on the wings will be reduced to a minimum when they are moving in a nonlifting direction. However upon a downward movement of the wings, at which time the full lifting efficiency of the wings is necessary, the vanes 28 are moved to closed positions as clearly shown in Figure 3, thereby insuring a maximum lifting action on the airplane as a whole. The wings 22 are primarily designed for raising the airplane vertically from the ground to an elevation sufficiently high to clear uneven ground, trees or obstructions and when at sufficient elevation the wings, in combination with the wings 11 form supporting planes for the airplane as a whole as it moved forwardly under the influence of the propeller 4, therefore it will be seen that the wings 22 are only used as a lifting means during starting and possibly the landing of the device, and when the device is in flight under the influence of the propeller 4, the wings do not rotate, and the wings 22 which project beyond the side lines of the airplane in a horizontal position form additional supporting planes for the airplane during its forward flight. To prevent retrograde rotation of the wings 22, the arms 27 are provided with ratchets 29, with which ratchets pawls 30 cooperate for holding the wings against rotation, especially when the outwardly extending wings 22 are stopped and will be used as planes during the forward movement of the airplane.

Vanes 28 are provided with arms 31 which are pivotally connected to links 32, and which links have one of their ends provided with arms 33 on which arms angularly disposed rollers 34 are mounted. The rollers 34 extend into a pear shaped slot 35, therefore it will be seen that when the cam 25 is rotated the pear shaped cam slot 35 may be positioned in positions where the vanes 28 will be opened to different angles in relation to the arms 27 of the wings 22, consequently the operator can control the vanes as desired during the vertical movement of the airplane. It will also be seen that the cam slots 35 may be positioned in positions where the planes will feather on the upward movement of the wings, and close on the downward movement of the wings. Secured to the forward ends of the cam sleeve 24 are worm gears 36, and with which worm gears vertically disposed worms 37 engage. The worms 37 are carried by vertically disposed shafts 38 supported by the forward struts 12 of the machine. Shafts 38 extend downwardly and have their lower end provided with bevelled gears 39, with which bevelled gears 39, bevelled gears 40 mesh. The bevelled gears 40 are carried by rearwardly extending shafts 41 at opposite sides of the machine and extend rearwardly to positions opposite the cock pit 42 of the fuselage 1. Extending outwardly from opposite sides of the fuselage 1 adjacent the cock pit 42 are shafts 43, the outer ends of which are provided with worms 44, which mesh with worm gears 45 carried by the rear ends of the shafts 41, therefore it will be seen that when the operator desires to change the positions of the vane control cams, it is only necessary for him to grasp the hand wheels 46 carried by the shafts 43 and rotate the same, which action will impart rotation to the shafts 41 and 38, and through the medium of the worms 37 and worm gears 36 the cams 25 will be simultaneously rotated, therefore it will be seen that the operator of the machine may control the angular position of the vanes in relation to the wing arms at all times.

From the above it will be seen that means is provided in connection with an airplane whereby said plane may rise vertically or land vertically to avoid obstructions. It will also be seen that the operator may from his position within the cock pit of the fuselage control the vanes of the rotatable wings and the wings may be rotated as desired by the operator through gear and shaft connections with the crank shaft of the engine within the fuselage. It will also be seen that clutch means is provided whereby the wing rotating mechanism may be easily and quickly thrown into and out of cooperative relation with the engine drive shaft.

The invention having been set forth what is claimed as new and useful is:—

1. The combination with an airplane, an engine carried by said airplane, a propeller for driving said airplane, said engine having driving connections with the propeller, of means for raising said airplane vertically, said means comprising horizontally disposed shafts carried by said airplane, radially disposed wings carried by said shafts, driving connections between the shafts and the engine and means for preventing retrograde rotation of said shafts.

2. The combination with an airplane, an engine carried by said airplane, a propeller for driving said airplane, driving connections between the engine and the propeller, of means for raising said airplane vertically, said means comprising horizontally disposed shafts carried by the airplane at opposite sides thereof, radially disposed wings carried by said shafts, shaft and gear means whereby said wing shafts may be simultaneously rotated, and pawl and ratchet means cooperating with the shaft and forming means for preventing retrograde rotation of the shafts and maintaining the wings in horizontal and vertical positions.

3. The combination with an airplane having an engine, of means for moving said airplane in vertical movement, said means comprising shafts rotatably mounted in bearings of the airplane, radially disposed wings carried by said shafts, pivoted vanes carried by said wings, a rotatable sleeve on the end of each of said shafts, a cam member carried by said sleeves, vane controlling means carried by the vanes and cooperating with the cam member, means for driving said shafts from the engine, gear means for rotating said shafts and cam members independent of each other, and means cooperating with the rotatable shafts for preventing retrograde movement thereof.

In testimony whereof I have signed my name to this specification in the presence of two subscribing witnesses.

WARREN L. COOPER.

Witnesses:
G. L. COOPER,
CLARA COOPER.